H. COLL.

Steam Operated Water Ejector.

No. 9,380. Reissued Sept. 21, 1880.

Witnesses

James K. Bakewell

L. C. Fitler.

Inventor.

Hugh Coll by Bakewell & Kerr

Attorneys

N. PETERS, PHOTO-LITHOGRAPHER, WASHINGTON, D. C.

UNITED STATES PATENT OFFICE.

HUGH COLL, OF BLACK HAWK, PENNSYLVANIA.

STEAM-OPERATED WATER-EJECTOR.

SPECIFICATION forming part of Reissued Letters Patent No. 9,380, dated September 21, 1880.

Original No. 90,930, dated June 8, 1869. Application for reissue filed September 4, 1879.

*To all whom it may concern:*

Be it known that I, HUGH COLL, of Black Hawk P. O., in the county of Beaver and State of Pennsylvania, have invented a new and useful Improvement in Steam-Operated Water-Ejectors; and I do hereby declare the following to be a full, clear, and exact description thereof, reference being had to the accompanying drawings, making a part of this specification, in which—

Figure 1:
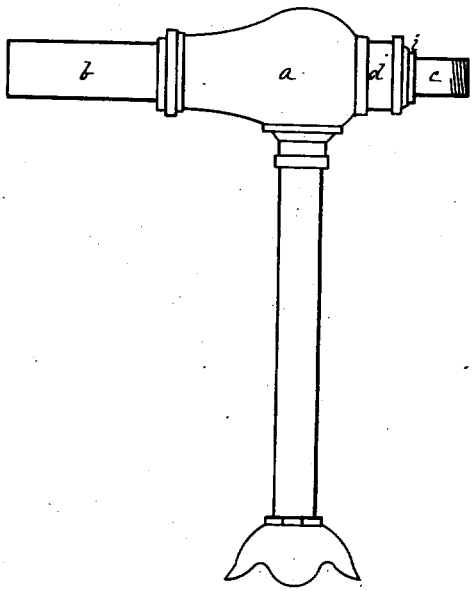
Figure 2:
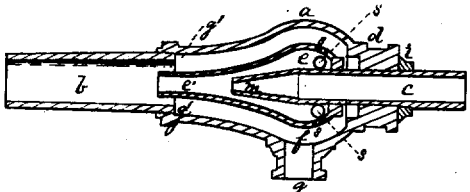

Figure 1 is a side elevation of my improvement, and Fig. 2 is a sectional view of the same.

Like letters of reference indicate like letters in each.

My invention consists of a steam siphon-pump having an inner head or shell which receives and surrounds the jet of steam, so as to prevent its too rapid condensation and to preserve its force.

To enable others skilled in the art to make and use my invention, I will proceed to describe its construction and mode of operation.

*a* is an outer pear-shaped head or shell, cast hollow, and tapering down at one end into an outer discharge-pipe, *b*. *c* is a steam-injection pipe screwed into or cast on the rear end of the head *a*, and extending forward any desired distance, provided its end does not go beyond the mouth of the inner discharge-pipe, *e'*. *e* is an inner head or shell, also cast hollow and pear-shaped, having one end tapered down to the form of a pipe or tube, which forms an inner discharge-pipe, *e'*. It is screwed onto the injection-pipe *c* or otherwise fastened. It may also be cast onto the pipe *c*.

*s s* are inlets or openings in the inner head or shell, *e*, which, when the head is in place, are opposite to or back of the discharge end of the steam-injection pipe *c*. These inlets or openings *s* allow the inflow of the air and water from the outer head or chamber, *a*.

*f* is an opening in the bottom of the outer head, *a*, into which the induction-pipe *g* opens for the admission and supply of water.

A nut, if desired, may be screwed onto the injection-pipe *c*, outside of the threaded neck *d*, to fasten it securely in position.

*m* is a nozzle, of any suitable construction, placed on the discharging end of the injection-pipe *c*.

The mode of operation of my improved steam siphon-pump is as follows: The steam, passing through the injection-pipe *c*, rushes out of the narrowed end or nozzle *m* with great velocity into the inner discharge-pipe, *e'*, and thence into and through the outer discharge-pipe, *b*. The force with which the steam passes into and through the discharge-pipes rarefies or exhausts the air in them, which tends to produce a vacuum in the heads or shells *a e*, which vacuum is immediately filled by the water coming up the induction-pipe *g*; and as the air is also expelled from the discharge-pipes *b e'*, the water following to fill up the vacuum thus formed is caught by the flow of steam, and is forced out of the discharge-tubes *e' b*, and a regular current is established, which is kept up by the continuous pressure of the steam. As the inner discharge-tube, *e'*, is much smaller than outer discharge-tube, *b*, the steam from the jet *m* rushes through it into the outer discharge-tube, *b*, with but slightly-diminished force, its force having been preserved by the narrowness of the inner discharge-tube, *e'*, while at the same time it expels from the inner discharge-tube, *e'*, through the outer discharge-tube, *b*, the water that enters the holes *s s* with great force, causing a very rapid current through the outer discharge-tube, *b*, which draws along with it the water in the outer head, *a*.

The old kind of siphon-pumps, having but one head, require a much greater head of steam than is necessary in my improved siphon, for the steam, coming in contact with such a large body of water as is in the single head of the old siphon, is sooner condensed, and so loses its power. In my improved siphon only about one-half the amount of steam is required.

The object of my invention is to obtain a device which will preserve the force of the jet of steam, and this I accomplish by causing the steam to enter the narrow limits of the inner head, which, preventing its contact with the whole mass of water, keeps it from condensing at once, and causes its whole force to be applied to the water which is directly in its path and within the inner head.

The end or nozzle *m* of the injection-pipe *c* may be placed anywhere along inside the inner head, *e*, provided it does not go beyond the limits of the outer head, *a*, and the inner head may be moved along the injection-pipe *c*, but works more effectually with the openings *s s* back of or opposite to some part of the induction-opening *f*.

The nozzle *m* may be made by drawing down the end of the injection-pipe *c*. The desired amount of steam may be admitted by reducing or enlarging the nozzle *m*.

This siphon-pump may be made of iron or any other suitable material. The heads are generally cast of iron.

I am aware that a steam-jet has been protected by a non-conductor to prevent condensation of the steam within the jet-pipe, and do not claim the same; but

What I claim as my invention, and desire to secure by Letters Patent, is—

In a siphon pump or ejector, the combination, with the outer shell and central steam-jet, of an inner head or shell which receives and surronds the steam-jet, said inner shell separated from the outer shell by an annular chamber, and communicating with the water-inlet pipe and with the discharge-pipe, substantially as and for the purpose specified.

In witness whereof I, the said HUGH COLL, have hereunto set my hand.

HUGH COLL.

Witnesses:

R. H. WHITTLESEY,

JNO. K. SMITH.